United States Patent
Monghal et al.

(10) Patent No.: US 9,825,715 B2
(45) Date of Patent: Nov. 21, 2017

(54) VIRTUALIZATION OF NATURAL RADIO ENVIRONMENTS USING FIELD TRACES AND A CHANNEL EMULATOR

(71) Applicant: Intel IP Corporation, Santa Clara, CA (US)

(72) Inventors: Guillaume Monghal, Aalborg (DK); Tommaso Balercia, Aalborg (DK); Christian Rom, Norresundby (DK); Jesper Blauendahl, Aalborg SO (DK); Ciano Frost, Klarup (DK); Hung Tuan Nguyen, Aalborg (DK); Marek Rohr, Aalborg (DK)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/394,575

(22) Filed: Dec. 29, 2016

(65) Prior Publication Data

US 2017/0111126 A1     Apr. 20, 2017

Related U.S. Application Data

(62) Division of application No. 14/761,876, filed as application No. PCT/US2014/050418 on Aug. 8, 2014, now Pat. No. 9,544,072.

(51) Int. Cl.
*H04B 17/391* (2015.01)
*H04B 17/00* (2015.01)
(Continued)

(52) U.S. Cl.
CPC ..... *H04B 17/0085* (2013.01); *H04B 17/0087* (2013.01); *H04B 17/309* (2015.01);
(Continued)

(58) Field of Classification Search
None
See application file for complete search history.

(56) References Cited

U.S. PATENT DOCUMENTS 8,761,025 B2   6/2014   Lee et al.
9,253,759 B2   2/2016   Chang et al.
(Continued)

FOREIGN PATENT DOCUMENTS

| KR | 10-2006-0098679 | 9/2006 |
|---|---|---|
| TW | 201240366 | 10/2012 |
| TW | 201345288 | 11/2013 |

OTHER PUBLICATIONS

English Translation of Search Report from counterpart Taiwan Patent Application No. 104122020, dated Aug. 3, 2016, 1 page.
(Continued)

*Primary Examiner* — David Bilodeau
(74) *Attorney, Agent, or Firm* — Schwabe, Williamson & Wyatt P.C.

(57) ABSTRACT

Natural radio environments are emulated using field traces and a channel emulator to test radio devices. In one example, a test includes a field trace source to replay recorded field traces, a protocol tester to receive the replayed field traces to extract configuration parameters from the replayed field traces, to extract signals from the field traces, to send the signals to a device under test, and to receive signals from the device under test, and a channel emulator coupled to the field trace source, and between the protocol tester and the device under test, to receive the replayed field traces, to mix the replayed field traces with signals and to emulate the channel between the protocol tester and the device under test.

20 Claims, 12 Drawing Sheets

(51) Int. Cl.
*H04B 17/345* (2015.01)
*H04B 17/364* (2015.01)
*H04B 17/309* (2015.01)

(52) U.S. Cl.
CPC ......... *H04B 17/345* (2015.01); *H04B 17/364* (2015.01); *H04B 17/3911* (2015.01); *H04B 17/3912* (2015.01)

(56) References Cited

U.S. PATENT DOCUMENTS

| | | |
|---|---|---|
| 2005/0267715 A1 | 12/2005 | Kolu |
| 2007/0019769 A1 | 1/2007 | Green et al. |
| 2012/0243419 A1 | 9/2012 | Lee |
| 2013/0006601 A1 | 1/2013 | Mlinarsky |
| 2013/0029608 A1 | 1/2013 | Kuo et al. |
| 2013/0281144 A1 | 10/2013 | Chang |
| 2014/0154995 A1 | 6/2014 | Kennedy et al. |
| 2014/0219123 A1 | 8/2014 | Diebenbusch et al. |

OTHER PUBLICATIONS

PCT/US2014/050418, Transmittal of the International Search Report and the Written Opinion of the International Searching Authority, dated Apr. 21, 2015, 17 pages.

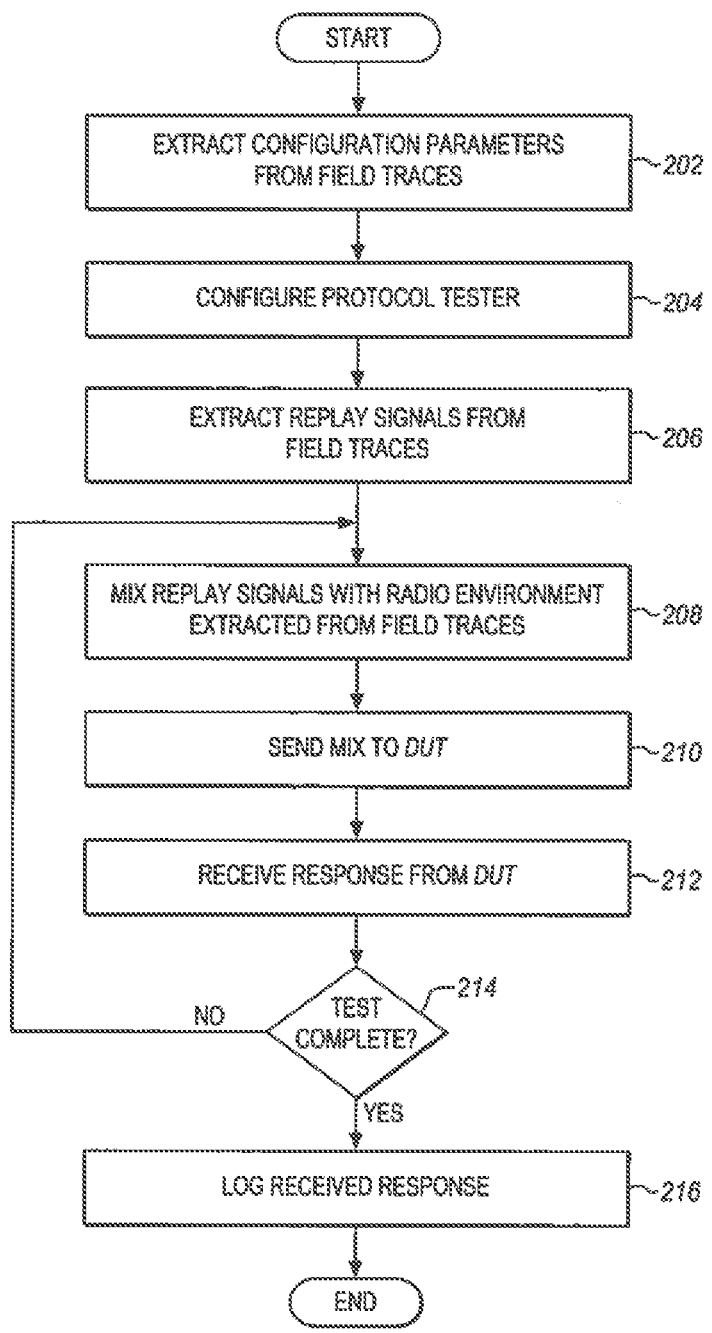

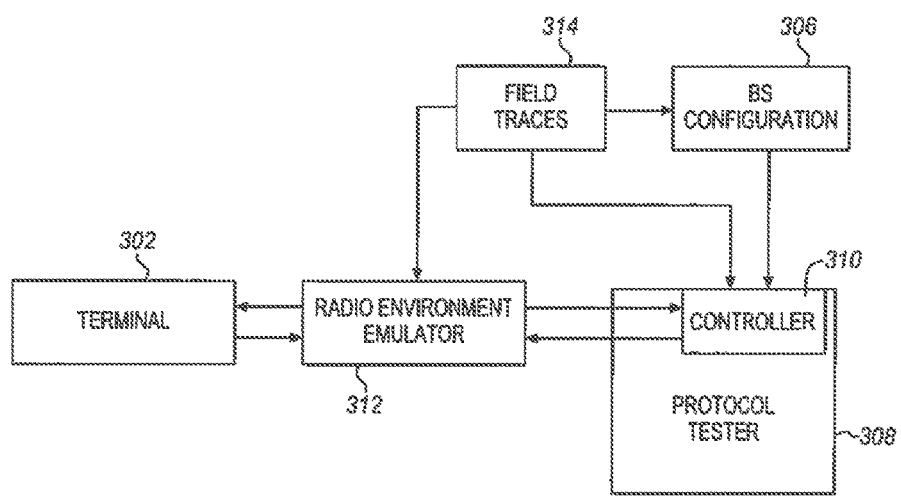

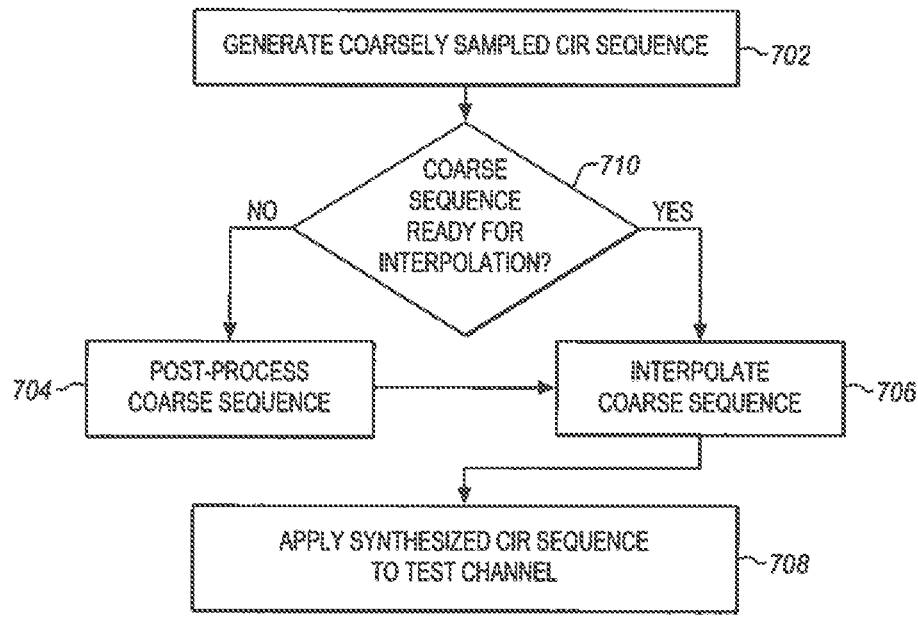
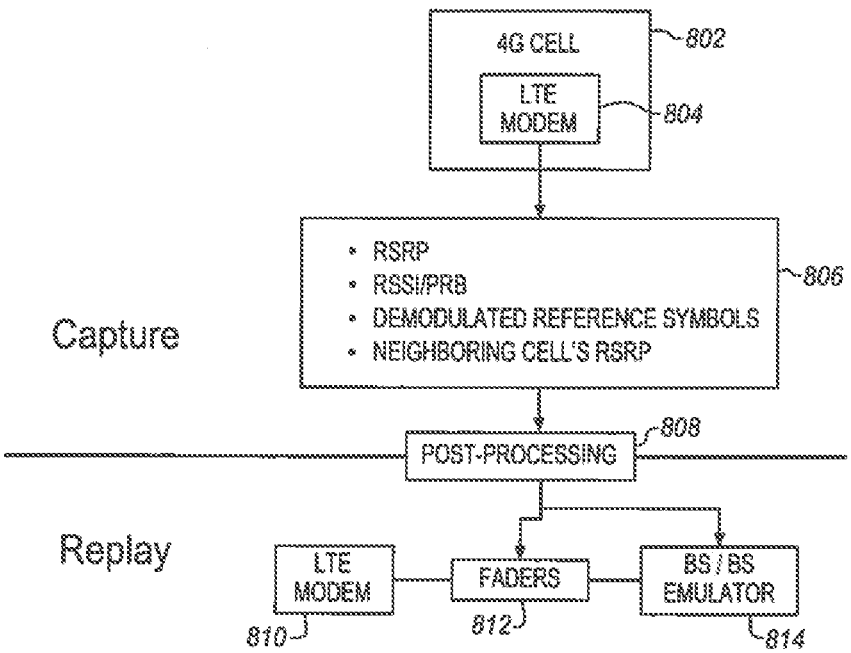

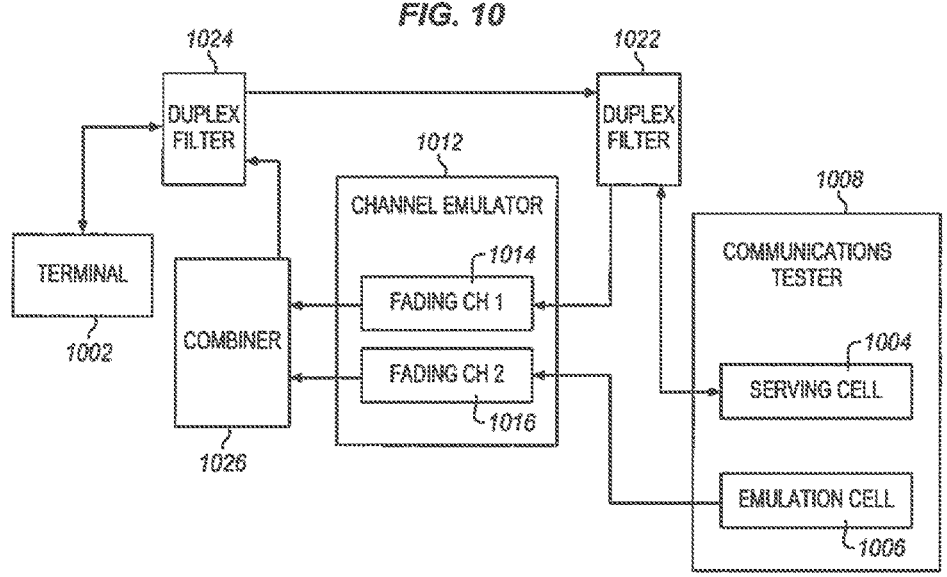

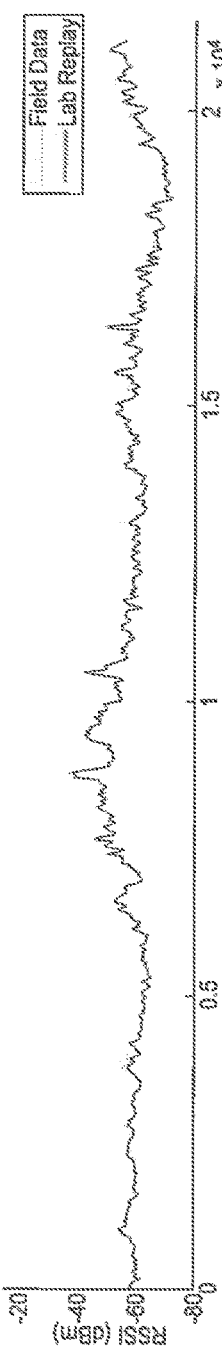
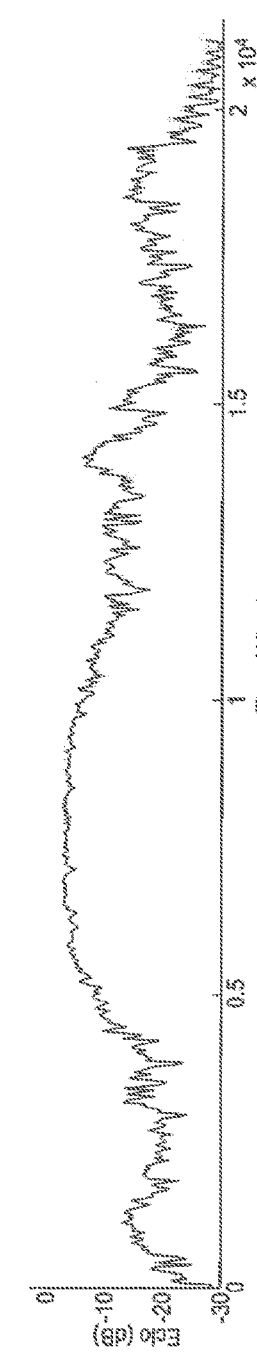
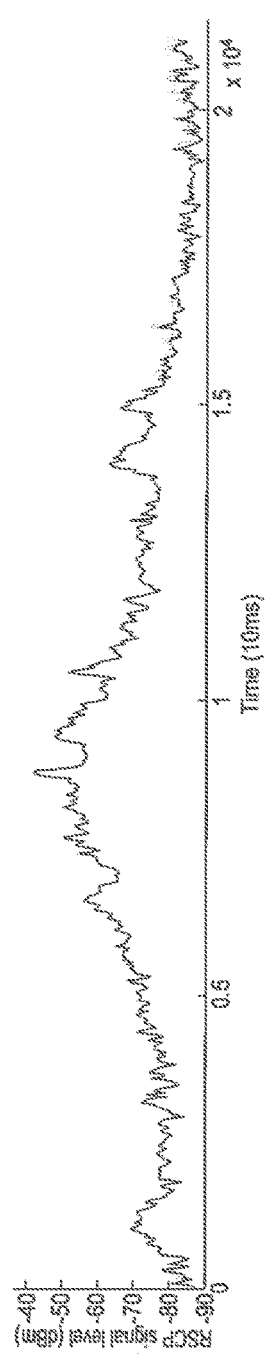
FIG. 11A
FIG. 11B
FIG. 11C

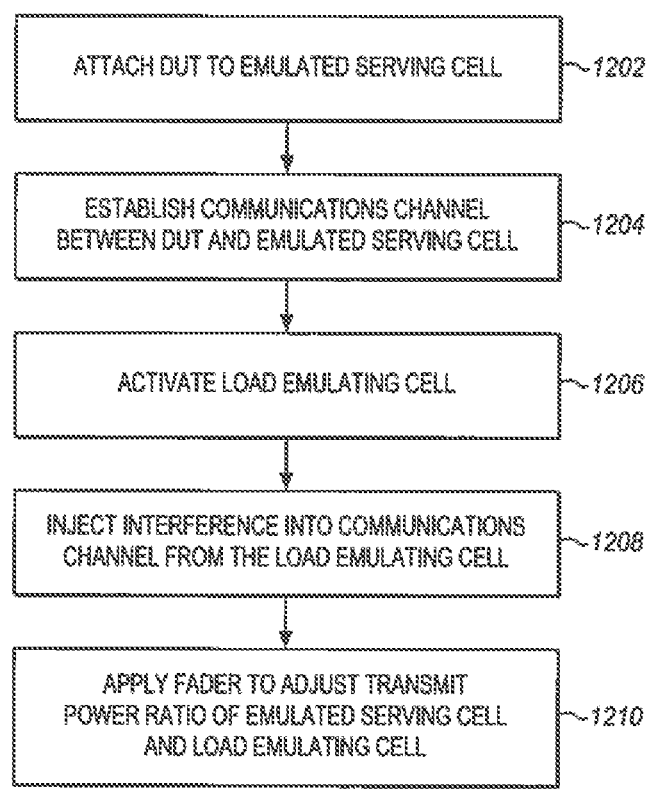

VIRTUALIZATION OF NATURAL RADIO ENVIRONMENTS USING FIELD TRACES AND A CHANNEL EMULATOR

CROSS-REFERENCE TO RELATED APPLICATIONS

The present application is a divisional of prior filed U.S. patent application Ser. No. 14/761,876 filed Jul. 17, 2015 entitled VIRTUALIZATION OF NATURAL RADIO ENVIRONMENTS TO TEST A RADIO DEVICE by Guillaume Monghal, et al. and PCT Application No. PCT/US2014/050418 filed Aug. 8, 2014 entitled VIRTUALIZATION OF NATURAL RADIO ENVIRONMENTS TO TEST A RADIO DEVICE by Guillaume Monghal, et al., the priorities of which are hereby claimed.

FIELD

The present description relates to the field of wireless communications and, in particular, to wireless device test.

BACKGROUND

Devices in a wireless communications system communicate with base stations, or other types of wireless stations in varying RF (Radio Frequency) environments. In the development of components and systems for wireless devices, the components and systems are tested to determine whether they are able to communicate with other stations, and to measure the RF and communications performance. This testing is most easily done in a laboratory under controlled conditions. The lab environment makes it easier to stress the performance of the device components. It also makes it easier to stress the communication abilities of a device.

A natural RF environment may be unpredictable and may vary greatly over time and place. Interference, multipath, and the transmission and reception quality of other stations varies over time and position. In addition, the registration, assignment, and other control protocols used by a wireless communications system may exhibit a complex and volatile behavior. All of these factors make it difficult to duplicate a natural RF environment in a testing laboratory.

BRIEF DESCRIPTION OF THE DRAWING FIGURES

Embodiments of the invention are illustrated by way of example, and not by way of limitation, in the figures of the accompanying drawings in which like reference numerals refer to similar elements.

FIG. 1 is a block diagram of a system for emulating an RF environment according to an embodiment of the present invention FIG. 2 is a process flow diagram for emulating an RF environment according to an embodiment of the present invention FIG. 3 is a block diagram of an alternative system for emulating an RF environment according to an embodiment of the present invention FIG. 4A is a graph of an example of recorded field traces that might be used with the system of FIG. 1 according to an embodiment of the present invention FIG. 4B is a graph of replayed data based on the field traces of FIG. 4A that might be used with the system of FIG. 1 according to an embodiment of the present invention.

FIG. 7 is a process flow diagram for generating a sequence of channel impulse responses according to an embodiment of the present invention.

FIG. 8 is a diagram illustrating the collection and replay of traces to emulate an RF environment according to an embodiment.

FIG. 10 is a block diagram of a system for reproducing a cell load for a terminal in an emulated RF environment according to an embodiment of the present invention.

FIGS. 11A to 11C are graphs of three different field metrics in a replay from the system of FIG. 10 according to an embodiment of the present invention.

FIG. 12 is a process flow diagram for conducting a test using the system of FIG. 10 according to an embodiment of the present invention.

DETAILED DESCRIPTION

Figure 1:
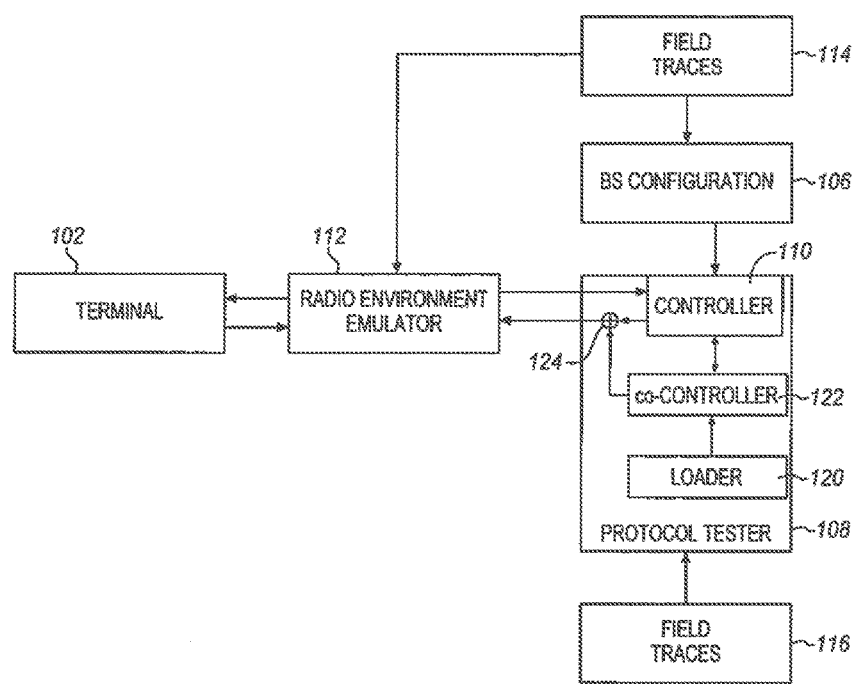

Embodiments of the present invention are presented in the context of a wireless terminal in communication with a wireless base station. "Terminal" is used to refer to the wireless end station of the wireless system which connects with or is used by a human user. The terminal may be fixed or mobile. It may be used for voice or data or both. "Base station" is used to refer to the wireless station between the terminal and other connections. The base station may connect to a central office, to a wide area network, such as the Internet, to a local or metropolitan area network, or directly to other terminals. It may connect to all of these and more.

Terminals and base stations may be identified by different terminology depending on the particular wireless interface standards or other conventions that are applied. A "terminal" as used herein may refer to devices referred by a variety of different names including mobile device, mobile station, or mobile equipment, handset, user terminal or user equipment, subscriber station, subscriber terminal etc. A "base station" may refer to devices referred to by a variety of different names including base transceiver station, access node, access port, or access station, eNB (evolved Node B), gateway, serving cell, serving node, etc.

Embodiments of the present invention provide for a simulation or an emulation of the effects of a real radio channel to be added to a communication channel between a terminal and a base station. These effects may include fading, multi-path, reflection, and signals from other sources, such as noise, cross-channel interference, adjacent channel interference and other effects. The device that adds these effects may be a fader, a channel emulator, an additional modem, or a variety of other types of devices. The term channel emulator typically refers in the context of the present invention to a device that emulates the effects of a radio propagation channel on a radio signal passing through that channel. These effects include fading and other effects as mentioned above.

In some of the embodiments described herein, natural radio environments are virtualized to test radio devices. In one example, this is done by extracting signals and messages recorded in the field and injecting them in the operation of a protocol tester. The extraction allows the temporal spacing that is observed in the field to be retained. In another example, the radio environment is reproduced by extending the capabilities of a channel emulator and supporting the extension by means of post-processing. This allows ray-tracing to be used as a way to produce realistic radio environments and test devices. In another example, the radio environment is recorded using a specific set of traces taken in the field. This allows the radio environment experienced in the field to be realistically replayed. In another example, natural radio environments are produced by recreating realistic intra-cell interference. This is done by reproducing the actual cell load in which the device under test would be operating.

Section I.

This section describes that the signaling between a base station, such as an eNB (evolved Node B), and a terminal may be reproduced in a laboratory. To do this, a protocol tester is extended with functionalities that allow it to load field traces and logs taken during field tests. The protocol tester may then extract the messages observed in the traces and configure itself using the messages found in such traces. The protocol tester can then forward the extracted messages to the DUT (device under test), which may be a wireless radio of any of a variety of different types such as a tablet, mobile computer, cellular telephone, wireless network node, wireless router, wireless hub, IOT (Internet of Things) device or any other device.

FIG. 1 is a block diagram of one example of a laboratory test setup for emulating an RF environment by extending a conventional protocol tester for channel replay. A terminal 102, serving as the DUT, is connected to a protocol tester 108 which mimics the behavior of a base station, eNB or any other type of base station, as described below. A base station configuration module 106 tracks and maintains the state of the emulated base station based on the signaling tracked in a collection of field traces. In some embodiments, the protocol signals between the DUT and the protocol tester may be logged by the controller of the protocol tester. The logs may then be accessed to allow the tests to be analyzed. However, the invention is not so limited.

In FIG. 1, a radio environment emulator 112 modifies the signals from the protocol tester to mimic a desired RF environment, i.e. the radio channel between a base station (BS) and the DUT. The emulator may be a simple attenuator or a complex fader. In one case it may affect only the signal from the protocol tester. In another case it may also alter other signals when the aim is to emulate an environment with noise and interferers. In the illustrated example, the emulator is coupled to a source of field traces 114. This may be in the form of a memory device, a signal generator or any of a variety of other forms. In one embodiment, the field traces are collected in the field, i.e. a natural RF environment, by driving or walking around in a natural environment and recording the natural RF environment. These recordings may be processed and then played back by means of the radio environment emulator, which will also combine them with the signals from the protocol tester.

The field traces used here and in the other examples are in the form of channel impulse responses (CIR) that are collected in the field using a mobile receiver. Alternatively, the field traces may be generated artificially in the lab. The CIR may be collected as a wideband channel characterization so that it contains all of the information desired to simulate or analyze any type of radio transmission through the channel, however, more focused collection may also be used. The mobile radio channel is modeled as a linear filter with a time varying impulse response, where the time variation is due to receiver and transmitter movements or changes in the dynamic radio environment. The CIR is the quantity that defines the effect of such a filter to an impulsive stimulus. In practice, the CIR is represented by the summation of impulses with different amplitudes and delays.

In prior laboratory testing, test cases are generally developed by a skilled engineer with the intent of isolating specific interactions between base stations and terminals. Provided that the radio environment is accurately emulated (and it generally is not), such a target can be achieved only when the protocol tester goes exactly through the same states that the base station would experience in the field. A typical protocol tester, however, will not go through exactly the same states because it is typically designed as a coarse approximation of several different possible base stations. That is, the protocol tester's operation is typically based on a subset of all of the states of all possible base stations. Moreover, protocol testers do not have the best or most recent algorithms developed by base station vendors that define the temporal evolution of the states. As a result, designed test cases are often ineffective in reproducing some of the specific signaling scenarios observed in the field.

In order to allow signaling scenarios to be more accurately reproduced, the functionalities of the protocol tester are extended as described herein to support signaling replay. The protocol tester 108 is driven by an internal or external controller 110 and communicates through a two-way communication channel with the terminal, chipset, radio system or other DUT 102.

In the example of FIG. 1, the protocol tester is configured using field traces instead of specially designed test cases. The field traces are also loaded directly into the protocol tester 108 from the same 114 source as used by the base station configuration block or from a second field traces playback source 116. The field traces source 116 is coupled to a loader 120, which acts as a buffer for an additional controller or co-controller 122 of the protocol tester. The co-controller extracts the messages of interest for the test. Any other message that is not of interest is left to the main controller 110 of the protocol tester to be generated or handled.

The field traces of the two replay sources 114, 116 may be the same or different. The first field trace source 114 is played back to the base station configuration module 106. The configuration module sends selected configuration signals to the main controller 110 of the protocol tester 108 so that the protocol tester can coarsely emulate the behavior of the base station in the field. The same or different field traces are also played back to the radio environment emulator. The configuration signals may be any signal configuring the DUT to be tested. The configuration signals are typically part of a broadcast channel that contains data to the DUT describing the parameters to be used for communication with the base station. Control signals may be replayed to the DUT during the test and these are typically part of a control plane or control channels of the wireless communication system, which include signals such as those for handover, registration, configuration, channel assignment, resource allocation and other configuration transactions. The particular channels and types of signals used for configuration and for control may differ with different wireless protocols and standards. Embodiments of the present invention may be adapted to work with a variety of different signals.

While testing, typically, there is a request from the protocol tester or the DUT and then a reply from the emulated base station at the protocol tester. The reply may or may not be followed by another signal. For handover, for example, there are several exchanges of configuration signals before the handover is complete.

The field traces from the second source 116 are provided by the loader 120 to a co-controller 122 of the protocol tester 108, which prepares these field traces to be combined in a mixer 124 with the protocol signals from the main controller 110. The output of the protocol tester is therefore the superposition of signals extracted from the field traces and replayed in their original format, and a set of internal signals. This allows the signaling scenario under analysis to be accurately and repeatedly replayed, without focusing on all the signals in the field traces.

This accurate replay does not require any more complexity from the protocol tester. As a result, most of the testing may be moved from the field to the lab without imposing additional costs. This may be particularly helpful with increasingly complex radio communications systems such as LTE (Long Term Evolution), LTE-Advanced, and MIMO (Multiple Input Multiple Output) transmission systems.

FIG. 2 is a process flow diagram of the operation of the lab test setup of FIG. 1 as described above. After the field traces have been collected, then at 202 signals are extracted from the field traces that define the base station configuration. This includes the configuration parameters from a base station and any other desired signals. At 204, the configuration parameters are used to configure the protocol tester. The configuration parameters are used by the base station configuration 106 to configure the controller of the protocol tester.

At 206 the to-be-replayed signals are extracted from the field traces. At 208, the to-be-replayed signals are mixed with a radio environment that is extracted from the field traces, for example in a channel emulator. As a result of the approach, the to-be-replayed signals are synchronized with the radio environment. This is described below in the context of FIG. 4B. At 210 the mixed signals are sent to the DUT.

At 212 any response from the DUT is received and at 214 this response is recorded for later analysis. At 216 more configuration signals are replayed to the DUT if the testing cycle is not complete. Otherwise the process ends.

FIG. 3 is a block diagram of an alternative structure to implement the functions of FIG. 2. Using a more powerful single controller and a more powerful single field trace source, some of the functions of the test equipment of FIG. 2 can be consolidated into fewer components. As shown in FIG. 3, a terminal 302 serves as the DUT. The DUT communicates through an emulated radio channel with a protocol tester 308. The emulated radio channel is a two-way connection through a radio environment emulator 312.

Recorded field traces are played back from a single source 314 to the emulator 312, to a controller 310 of the protocol tester 308, and to a base station configuration module 306. The base station configuration module extracts configuration parameters from messages in the field traces and supplies those to the protocol tester controller. The controller may also extract signals from other base stations and other terminals contained in the field traces, and may combine these with the configuration messages for transmission to the DUT. The radio channel emulator adds noise and interference from the field traces to the radio signals sent to the DUT.

As a result, the test equipment of FIG. 3 performs the same or similar functions as the test equipment of FIG. 2. These two examples are provided to show some variations of the described test setups. Many other variations may be made, depending on the particular implementation.

Figure 4A:
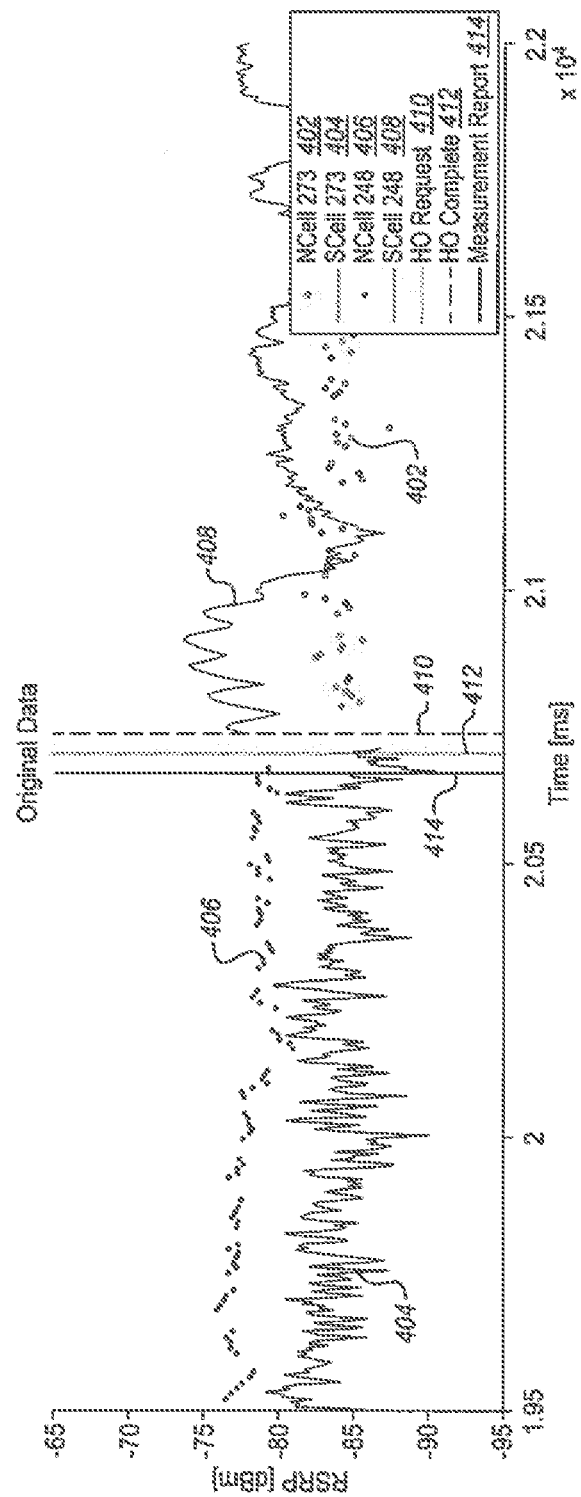

FIG. 4A shows an example of recorded field traces for specific messages related to a handover. The signals are shown in a graph with RSRP (Reference Signal Received Power) on the vertical axis and time on the horizontal axis. The signals refer to recorded session layer 3 messages of LTE, namely a handover request and a handover complete. The graph shows that at a specific time, a power measurement signal 414 was sent by the terminal. This was followed by a handover request signal 412 and then a handover complete signal 412. These signals are recorded in an environment that includes traffic 404 on the channel of the serving cell 273 before the handover and traffic 408 on the serving cell 248 after the handover. In the first part, there is interference 406 from cell 248. In the second, after the handover, the conditions are reversed and the interference 402 is from cell 273. There may be many other sources of noise and interference but these are shown as examples.

Figure 4B:
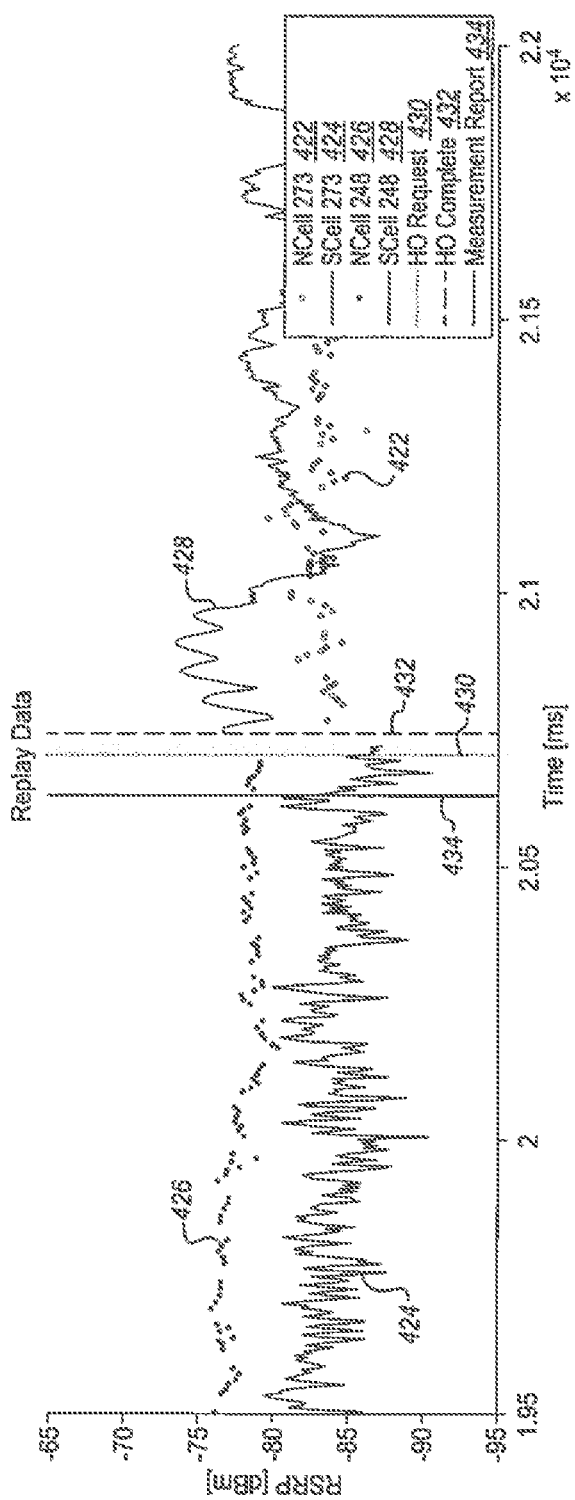

FIG. 4B is a similar graph horizontally aligned with the graph of FIG. 4A. However, instead of showing the recorded signal, FIG. 4B shows actual replayed data by means of the method described herein. The signals correspond to a replay session of the same layer 3 messages as in FIG. 4A. The handover request 430 and handover complete 432 remain accurately aligned in the time domain. The other message, the measurement report 434, a message sent by the terminal, is left uncontrolled. The same traffic 424, 428, and interference signals 422, 426 are present and are time aligned as they are replayed. The messages to the DUT were extracted from field traces, then synchronized and sent to the DUT by the protocol tester, as indicated herein.

Section II.

This section describes that an emulated radio environment may be created by means of deterministic propagation models using a fader. Spatial diversity is being increasingly exploited in radio communications, e.g. in single-user MIMO, multi-user MIMO and other transmission schemes. As a result, synthetic channel traces created by means of deterministic propagation models are expected to play an increasingly important role during the verification phase of radio terminals and their components.

As described herein, such traces are generated using a ray-tracer, loaded into a fader or channel emulator and then used to test a given device. A highly detailed trace renders the testing more realistic. As a result, the traces will often need to be prohibitively large, and require substantial processing resources to be generated. As described below, however, realistic channel traces may be generated without exceeding the storage, buffer, and memory limitations of a fader and without incurring into the computational shortcomings of a typical ray-tracer.

The fader, such as the radio environment emulators 112, 312 described above, use a sequence of channel impulse responses (CIRs) to emulate the channel. If the channel is finely sampled, generating and loading the traces may be unmanageable because of memory and processing requirements.

Memory and computational load may be reduced using the following operations. First, the original sequence of CIRs is replaced with another sequence of CIRs sampled less finely. As used herein, coarser sampling refers to fewer CIR samples per unit of time or space, which reduces the data rate of a stream of samples. Finer sampling or a finer sampling rate has more samples per unit of time or space instead. Second, the fader is provided with the intelligence necessary to retrieve the original sequence from the replacement sequence. This can be achieved, for instance but not exclusively, if the replacement sequence of CIRs is a sequence in which each CIR is described by
a) the position of the receiver,
b) the speed of the receiver,
c) a sequence of taps, where each element is represented by:
 i) a unique ID that identifies the ray responsible for the tap,
 ii) its delay,
 iii) the associated complex channel gain,
 iv) the angle of arrival of the ray with respect to the direction in which the receiver is moving, and
 v) the angle that identifies the elevation at which the probing agents sees the source or the last scatter, and
d) two flags reporting respectively on whether the ray is active in the previous and in the next sample of the CIR sequence.

The flags in (d) can indicate two possible cases. In the first case, the ray is active on two adjacent samples. In the second, the ray is active only on one of the two adjacent samples.

Figure 5:
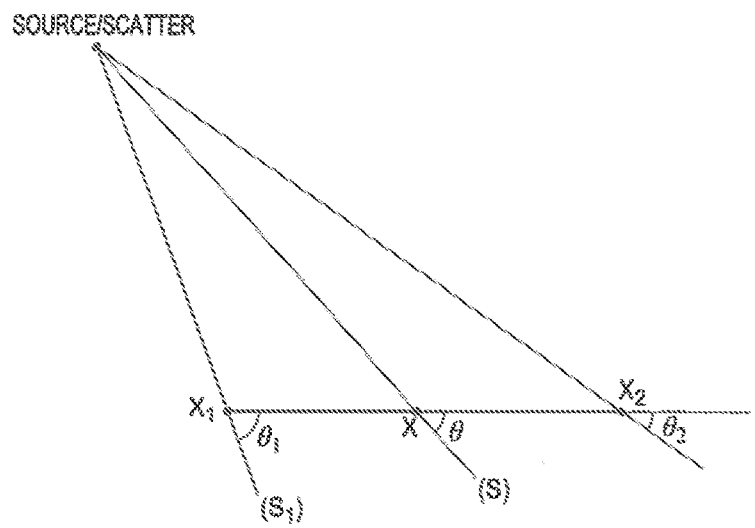
FIG. 5 is a diagram showing a ray that is active on two adjacent samples of a sequence of channel impulse responses according to an embodiment of the present invention.

When the ray is active in two adjacent samples, it can be assumed to remain active within the segment that links the positions $x_1$ and $x_2$ in which the samples are taken. FIG. 5 shows an example with the ray active on two adjacent samples. The ray in x is here assumed to have an angle of arrival of $\theta$. In $x_1$, similarly it has an angle of $\theta_1$, and in $x_2$ it has an angle of $\theta_2$ from the source. Using these angles of arrival, as defined in FIG. 5, and indicating the complex channel gains in the samples $x_1$, $x_2$ as $h_1$, $h_2$, the complex channel gain in x may be, for instance, determined as follows:

$$|h| \approx \frac{|h_2| - |h_1|}{\|x_2 - x_1\|} \|x - x_1\| + |h_1| \qquad \text{Eq. 1}$$

and $$\angle h \approx h_1 + \frac{2\pi}{\lambda} \int_{s_1}^{s} \hat{k}(s) \cdot \hat{d}(s) \, ds \qquad \text{Eq. 2}$$

where $\lambda$ is the wavelength of the radiation used for transmitting data, $\hat{k}(s)$ is the unit vector indicating the local direction towards which the radiation is propagating, $\hat{d}(s)$ is the unit vector representing the local direction towards which the receiver is moving, $$\theta \approx \frac{\theta_2 - \theta_1}{\|x_2 - x_1\|} \|x - x_1\| + \theta_1 \qquad \text{Eq. 3}$$

$$\varphi \approx \frac{\varphi_2 - \varphi_1}{\|x_2 - x_1\|} \|x - x_1\| + \varphi_1 \qquad \text{Eq. 4}$$

and $\phi$ indicates the elevation. As for the delay $\tau$ of the ray in x, it can instead be expressed as $$\tau \approx \tau_1 + \frac{1}{c} \int_{s_1}^{s} \hat{k}(s) \cdot \hat{d}(s) \, ds \qquad \text{Eq. 5}$$

where c is the speed of light in a vacuum.

When the ray is active only in one of the samples, for instance $x_1$, the interval $[x_1, x_2]$ can be expressed as the union of two subsets $[x_1, x_S]$, $[x_S, x_2]$, with the ray being active only in $[x_1, x_S]$. As can be easily inferred, $[x_S, x_2]$ brings no contribution, and handling $[x_1, x_S]$ is simply a matter of using Eq.1-Eq.5. In this case, the only problem is thus estimating the location of $x_S$. In this regard, three cases can be identified:
 1) $x_S$ is placed randomly within the interval,
 2) $x_S$ is placed in a position of the interval according to an arbitrary policy (e.g., in the middle of the interval),
 3) the interval is resampled until a certain granularity is reached and one of the previous options is then applied.

Figure 6:
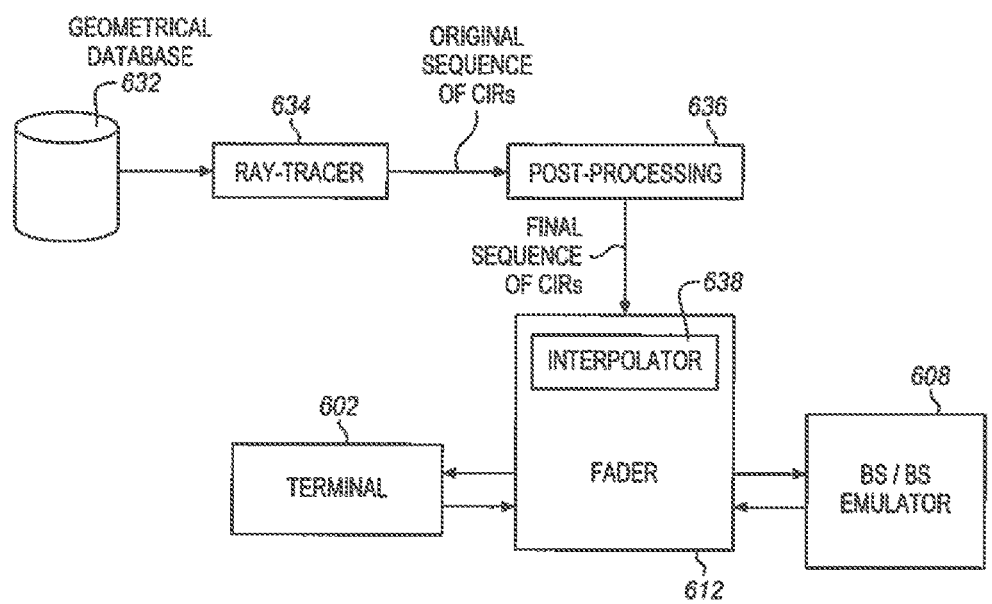
FIG. 6 is a block diagram of a test system using ray-tracing for field-realistic testing according to an embodiment of the present invention.

The simplification and interpolation techniques described herein may be implemented according to the architecture shown in the block diagram of FIG. 6. FIG. 6 shows a portion of a test system such as those of FIGS. 1 and 3. As in the above, signals are generated or replayed by a base station or a base station emulator 608 and sent, through a fader 612 (or channel emulator), to a terminal 602 that is under test, i.e. a DUT. The fader uses a sequence of CIRs to emulate a radio channel.

The CIRs are generated using a geometrical database 632 with a ray-tracer 634. In case the sequence of CIRs is complete with all the information enumerated above, the sequence can be directly provided to an interpolator 638 of the fader. The interpolator then generates the final synthetic sequence of CIRs according to the procedure described before. In general, however, the original sequence may lack some parts, typically, the speed of the receiver, the ID of each ray, and its flags.

If this is the case, the post-processing 636 generates any additional parameters of the original sequence that may be useful for the interpolator. These additional parameters may include any one or more of the parameters listed above, such as angles of arrival, position, and velocity of the receiver, etc. These parameters are provided to the interpolator. The post-processing may integrate the original sequence with any missing data so that the interpolator 638 can successfully apply, for instance, the procedure described above. Alternatively, post-processing may send the additional parameters as an ancillary data set with or beside the coarse sequence. This yields a significant reduction in the amount of memory required inside the fader to store the traces, and in the time needed to have a finely sampled sequence of CIRs.

The fader 612 in the example of FIG. 6 has been augmented with an interpolator 638 which is able to take the sequence of coarsely sampled CIRs from the ray tracer. The interpolators use this information to generate a second set of CIRs at a higher sampling rate.

The interpolator, which may be implemented in existing hardware or use additional or modified hardware in the fader, is able to reconstruct the rays using the CIRs from the post-processing 636. This may be done as the signals are sent to the terminal so that the full, high sample rate rays are not stored or processed in the fader.

FIG. 7 is a process flow diagram of a method for generating a sequence of channel impulse responses to test a wireless radio communications device. In this method at 702 a first sequence of coarsely sampled CIRs is generated. This is done by the ray tracer 634 using a geometrical database 632 as input.

At 710, if the coarse CIR sequence is ready for use by the interpolator 638, then the sequence may be supplied directly to the interpolator to be interpolated into a finer sequence of CIRs. If at 710 there is not enough information for interpolation, the sequence is post-processed at 704 to generate the information.

At 706 a synthesized fine sequence of CIRs is generated from the first coarse sequence. This may be done by interpolation using the provided parameters or in any other desired way. At 708, the synthesized CIRs are applied to a test channel. This may be a test channel between a protocol tester and the wireless radio communications device to be tested as shown, for example in FIG. 6. The sequence may be applied to a terminal in the consequence of a larger test system such as that of FIGS. 1, 9, 10, etc.

Section III.

This section describes that a wireless channel may be replayed to a test a device using field traces collected by device itself or a similar device. FIG. 1 shows a test configuration in which field traces 114 may be played back through a protocol tester and a channel emulator. For LTE devices, if the radio environment is to be portrayed accurately, the field traces must contain a large amount of information. In accordance with the methods described herein, such information can be collected directly from an LTE receiver by altering its architecture. This enables channel replay with a high level of realism.

LTE devices can calculate, estimate or retrieve the DRS (Demodulated Reference Symbols), RSRP (Reference Signal Received Power), RSSI (Received Signal Strength Indication) per PRB (Physical Resource Block) and RSRP of neighboring cells, among other signals during their operation. While it is possible to retrieve all of these quantities, a terminal will typically only retrieve those quantities which are required or necessary for operation. Accordingly, some of these quantities are not normally retrieved during normal operation. All of these quantities are helpful for replaying the environment experienced in the field. Normally, however, they are not made fully available to a test engineer.

With a device capable of recording the aforementioned internal data a realistic replay becomes possible. When a standard LTE receiver such as a cellular telephone, mobile notebook computer, or tablet is used to record the data, the radio channels may be recorded taking into account the radiation pattern of the receiving antennas, i.e. of the antennas of the final device, improving realism.

FIG. 8 is a diagram illustrating the collection and replay of traces using a mobile terminal, such as an LTE receiver, capable of retrieving and recording the internal data. The device 802 collects traces 806 using its radio modem 804. This may be done by first establishing a signaling link with a wireless serving node, however, a signaling link is not necessary. Received information may simply be logged without establishing a link. After the traces are captured, the traces are exposed to post processing 808 to prepare them for replay.

For replay, the signals are produced by signal generators 814 such as the protocol tester 108, 308 of FIGS. 1 and 3. In one embodiment, the signal generators are base station emulators, but the invention is not limited to such a case. The generated signals are applied to faders 812, such as the radio channel emulators 112, 312 and then to an LTE modem 810, which is the DUT. This may be the same modem 804 that was used to collect the signals or a different modem.

Figure 9:
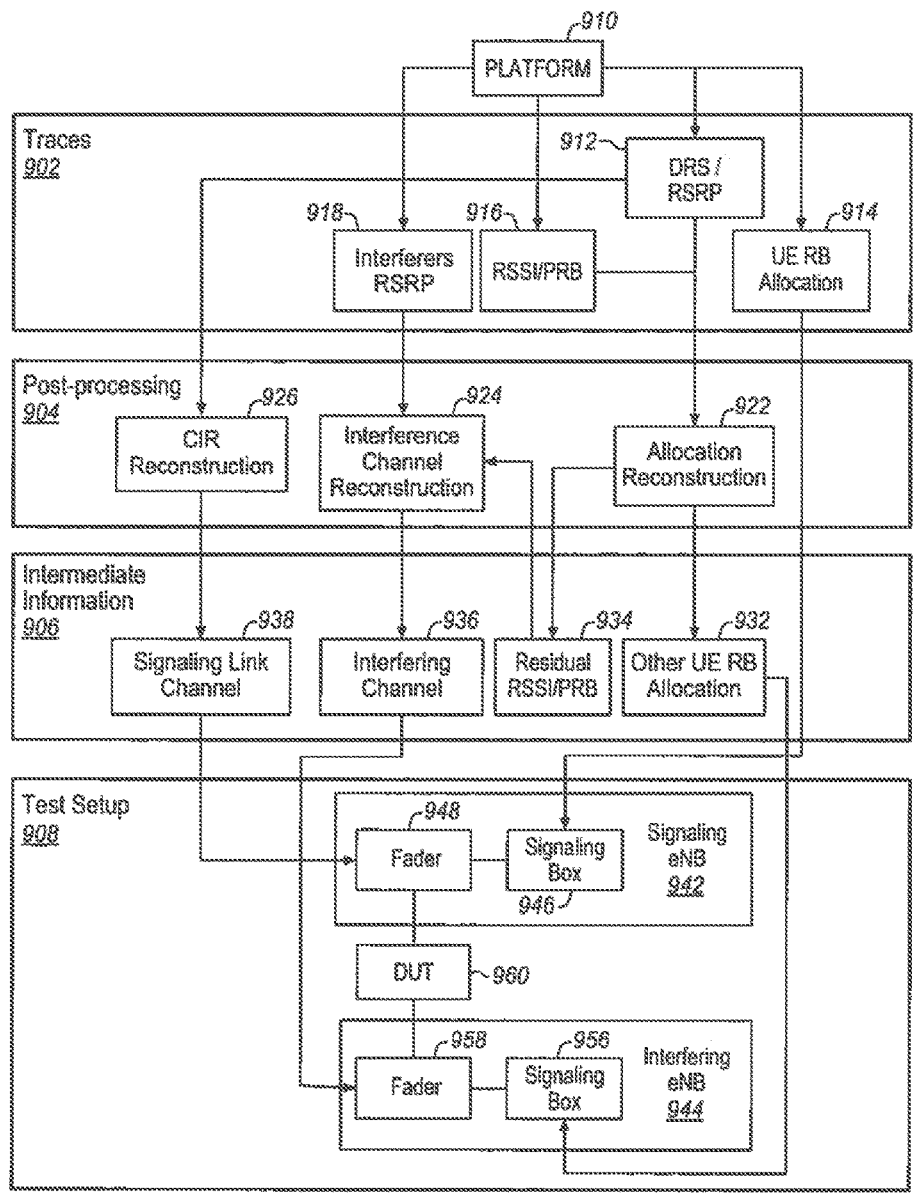
FIG. 9 is an expanded diagram of the collection and replay of FIG. 8 according to an embodiment of the present invention.

FIG. 9 is a block diagram showing these principles and a capture and replay procedure in further detail. The first stage 902 in the procedure is the collection of traces in the field. The second stage 904 is the extraction and post processing of the collected traces. The third stage 906 develops intermediate information. The fourth stage 908 is use of the test setup.

During the first stage, test traces are captured and then extracted from the platform 910. The platform may be a final product or some components from a final or developmental product. Alternatively, a special trace collection system may be used.

The traces may correspond to the RSRP of Interferers 918. These traces keep track of the effect of neighboring cells or other radios operating in the same cell in which the platform is active. The RSSI/PRB 916 corresponds to the total energy received per PRB. The DRS/RSRP 912 in turn provides an indication on how the channel behaves in the used LTE bandwidth. The UE RB allocation 914 is also extracted to provide the allocation of resource blocks (RB) to the LTE receiver 910 in each sub-frame. While these parameters are all expressed using terminology for LTE, the invention is not limited to any specific instantiation of LTE. All of the information in the traces section 902 may be extracted from field traces collected by an enabled modem 910. This modem is modified so that it collects all of the desired information in the field through field traces, stores that information, and allows that information to be retrieved.

Post processing 904 uses this information to extract the relevant data and produce the channel conditions used by parts of the process. The post-processing may done using an external elaboration unit of any suitable type. An advanced protocol tester or computer may be used, for example. First of all, post-processing is meant as CIR reconstruction 926, in which the DRS/RSRP 912 are used to produce an estimate of the time-varying CIR for each MIMO link used by the LTE system. As this is performed outside the UE, and before any testing is performed on a DUT, advanced algorithms with long processing times are allowed. After the temporal evolution of the CIR is estimated for each link, Interference Channel Reconstruction 924 provides a description of the trend of the inter-channel interference. Another process is Allocation Reconstruction using the RSSI/PRB and the Signaling DRS/RSRP. This process is used to determine the set of PRBs allocated to other UEs in each sub-frame. Additional post-processing may be performed, depending on the particular implementation.

After post processing, intermediate information 906 may be created that includes channel and resource allocation information. Signaling Link Channel 938 is the power scaled, time-varying CIR data based on the CIR reconstruction algorithm. In one embodiment, the power scaling occurs in the fader, but the invention is not so limited. The Interfering Channel 936 is the time-varying inter-cell interference, i.e. the interference due to neighboring cells.

Residual RSSI/PRB 934 is intermediate data used for reconstructing the interfering channel. As shown, this data is derived from the allocation reconstruction 922 of the post-processing stage 904 and then supplied to the interference channel reconstruction 924 of the post-processing stage. The interference channel reconstruction 924 is used to generate the interfering channel 936. The residual RSSI/PRB is not used for any other purpose, although the invention is not so limited.

Other UEs RB allocations 932 are derived from the allocation reconstruction 922 from post processing 906. This is the time-varying RB allocation information of the UEs other than the DUT. In this example, the platform's 910 own RB allocations are recorded in the traces at 914. The RB allocation of other UE's are not typically collected and tracked by the platform but can be extracted in post processing 904 by reconstructing the allocations in 922 and then determining in 932 which allocations are for other UEs.

The intermediate information derived in 906 may then be put into a test setup 908 that can account for signaling and interfering eNBs. In this case, the signaling may be any type of signaling in the control plane or the data plane. The test setup may be made using two different branches 942, 944. As shown, the first branch 942 represents the signaling link and the second branch 944 represents the interfering links. Each of the two branches has a signal generator 946, 956 coupled to a respective fader 948, 958.

The faders each feed a signal to the DUT 960 which may be the same as the platform 910 or different. The signals may first be combined in a combiner 1026 as in the example of FIG. 10. In addition, the signaling boxes 946, 956 may be combined together, combined with their respective faders or consolidated in other ways, depending on the particular implementation. In one embodiment, protocol testers as described herein are used as signaling boxes. Duplexers, combiners, splitters and filters may be added as appropriate, depending on the particular implementation.

The signaling boxes receive the respective UE allocations. The signaling eNB emulator 946 receives the UE RB allocations, 914 for the collecting UE. These RB allocations are used to apply the correct RB allocations for the DUT. Signaling is generated based on these allocations and sent to the corresponding fader 948. The fader 948 applies the correct fading according to 938. The faded signal from the signaling box 946 is then sent to the DUT.

The interfering signaling box 956 receives the RB allocations 932 that have been extracted in 906. These allocations are used to simulate the presence of other UEs in the system. The fader 958 uses the interfering channel information 936 directly, or through a form of post-processing to fade the signal output by the signaling box 956. Once faded, this is also sent to the DUT. The DUT finally communicates back with the emulated signaling eNB, or in another way so that its responses may be tracked and measured during the test.

Section IV.

This section describes that a realistic representation of intra-cell interference may be generated in the lab by simulating a realistic cell load. While field testing provides the most realistic way to stress a DUT, field testing is time consuming, expensive and not easily repeatable. The techniques described above allow signaling and fading normally encountered in the field to be replayed in a laboratory. This reduces long term costs and provides full repeatability and control. In replaying field tests, however, an important aspect to consider is the possibility to replay realistic interference. In section III, this was addressed for LTE and technologies based on LTE by tracing the RSSI per PRB and allocations. Focusing now on intra-cell interference for WCDMA (Wideband Code Division Multiple Access) systems, this section addresses how to achieve a realistic representation of the intra-cell interference experienced in the field.

A typical approach to intra-cell interference replay is to inject white Gaussian noise. However, such a technique is often ineffective. The impact of white noise is in fact far worse on the receiver than that of any interfering WCDMA signals. As described herein, realistic interference can be produced by injecting downlink physical channels with orthogonal channelization codes synchronously with the usual dedicated and shared channels. This reproduces the correct cell load and, consequently, creates realistic intra-cell interference.

FIG. 10 is a block diagram of a lab test system capable of reproducing the correct cell load. A communications tester 1008, such as a protocol tester, is coupled to a channel emulator 1012. The channel emulator is coupled to a DUT 1002, such as a wireless transceiver or user equipment as in the other descriptions. The DUT may in turn be a portable or fixed device, and it may be components of or a complete wireless radio.

The communications tester is equipped with a serving cell emulator 1004 to generate protocol signals, commands, and other traffic, and with a load emulating cell emulator 1006 to generate an approximation of the interfering signals that would be experienced in a field test. The signals from the two cells are sent respectively to the fading channel 1014 and 1016 of the channel emulator, and then sent to the combiner 1026. As shown, the load emulating cell influences the DUT only with its downlink traffic.

The serving cell emulator is coupled to a duplex filter 1022. The duplex filter separates uplink and downlink signals, and, in other embodiments, may be integrated inside other components of the diagram. Uplink signals, i.e. signals from the DUT 1002, are received from a second duplex filter 1024 that separates and sends them to the first duplex filter 1022, which is in turn connected to the serving cell emulator of the communications tester. As for the duplex filter 1022, the duplex filter 1024, in other embodiments, may be integrated inside other components of the diagram. This type of cabling allows the uplink signals to be received without being degraded at the channel emulator, and to keep thus the focus of the tests on the DUT, but the invention is not so limited. The RF duplex filters 1022, 1024 and the combiner 1026 are designed to operate at the central frequency chosen for the test scenario. These components may, however, be tunable to allow tests to be operated for different frequency bands. Alternative hardware cablings may also avoid the use of the duplex filter 1022 when the communication tester maps the downlink and uplink onto different ports.

As explained, the downlink signals from the serving cell emulator 1004 are separated by the duplex filter and sent to a first fading channel 1014 of the channel emulator. The two downlink channels from the two channels of the channel emulator are combined in a combiner 1026 and then sent to the DUT through the second duplex filter 1024. The second duplex filter allows the DUT to be connected to a single connector for both uplink and downlink channels. The particular configuration may, however, be modified to suit a variety of different circumstances, and components may be combined depending on the particular hardware devices used for the lab test system. In addition, there may be other signal sources (not shown) such as field trace, test case, and CIR sources that complete the test scenario.

In the illustrated example, the DUT 1002 is in physical contact with a test block for power, temperature and other conditions, and connected through the duplex filters, combiner, and channel emulator to the communications tester. The DUT and the communications tester may then be activated so that a registration process is established with the DUT, and the DUT is registered and attached to the serving cell 1004.

With the DUT attached, the emulated load emulating cell 1006 is activated and brought to inject orthogonal channel noise into the downlink physical channels. According to the desired level of cell load, the power associated with each fading channel is then changed. For instance, either the power associated with the first fading channel (serving cell) is reduced or the power linked with the second fading channel (load emulating cell) is increased.

As shown in FIG. 10, the communications tester is configured to emulate any desired type of base station or other WCDMA wireless station. In the illustrated example, the communications tester simultaneously simulates two complete WCDMA downlink signals with the same scrambling code. These two signals are synchronized to the chip, meaning for example a common WCDMA frame start within less than 1 chip. The channel emulator allows the test equipment to modify the relative power proportions of all of the simulated DL physical channels and introduce multipath propagation models for each of them. The tester may generate physical DL channels with any desired channelization code. It may also generate OCN (Orthogonal Channel Noise) at any given power level.

As mentioned above, a first WCDMA cell is set up as the "Serving cell" and this cell will hold a connection with the device under test (DUT). The power levels of the DL channels are set to standard values for WCDMA. After this, a second WCDMA cell is set up as the "Load emulating cell". This cell may have any variety of different configurations. In one embodiment, it is synchronized per frame and per chip to the serving cell, and the common and dedicated WCDMA DL physical channels have their powers reduced. This ensures that the major part of the output power is then in the OCN channels, which have different channelization codes from the common and the dedicated channels.

To emulate the actual channel conditions, the channel emulator may be controlled to adjust the power between the two emulated cells. This allows two channels to be created, with identical multipath profiles, but with different output powers. Fading channel #1, from the serving cell, emulates the desired multipath, but follows, in terms of output power, the power level of the desired RSCP, which is the captured power on the shared pilot channel P-CPICH (P-Common Pilot Channel). Fading channel #2, from the load emulating cell, also emulates the desired multipath, but the output power for this channel follows another power level, so that the total power reaching the DUT from the fading channels #1 and #2 match the captured RSSI, which is the total received signal strength in the WCDMA bandwidth of interest.

By adjusting the relative power levels between the two channels in the channel emulator, the DUT will receive the correct power level of the pilot channel (P-CPICH) and the correct power level of the data channels (because the power control decisions for the data channels are made based on pilot channel power). For the same reason, the DUT will also be exposed to the same RSSI values that are measured in the field.

FIGS. 11A, 11B, and 11C show three different field metrics on the vertical axis as three different horizontally aligned graphs in a replay through a lab setup when the ICI (Inter-Channel Interference) is produced as described herein. FIG. 11A shows RSSI in dBm. FIG. 11B shows $Ec/Io_{dB}=RSCP_{dB}-RSSI_{dB}$ in dB and FIG. 11C shows RSCP in dBm. The solid line curve shows the lab reply and the dotted line curve shows the original field data. The measurements of these metrics in the field are virtually the same as those in the lab using the described apparatus and techniques.

FIG. 12 is a process flow diagram for conducting a test using a test system such as that of FIG. 10. In the process flow of FIG. 12 at 1202 a DUT is attached to an emulating serving cell. This may be a base station emulator for a WCDMA system, but the invention is not so limited. This attachment includes registration, channel assignment, the communication of channel configuration parameters and other signaling.

At 1204, a communications channel is established between the DUT and the base station emulator. At 1206, a load emulating cell is activated; this may occur before or after the operations of 1202 and 1204. At 1208 the load emulating cell injects interfering signals into the established communications channel between the DUT and the base station emulator corresponding to the serving cell.

Orthogonal channel noise is injected as an interfering signal. In this case, orthogonal noise refers to the fact that this is orthogonal to the channelization codes of the shared and dedicated communication channels of the serving cell. This more closely resembles the interference in a natural radio environment. To produce more realistic noise, the load emulating cell is also synchronized, per frame and per chip, to the emulated serving cell. In this way, the frames of the interfering signals are also synchronized with the serving cell. Since the two emulated base stations are emulated in the same lab, and perhaps in the same hardware, the signals are synchronized by connecting the two base station emulators, or using a common time reference.

At 1210, fading is applied to the established communications channels and the transmit powers of the emulated serving cell and of the load emulating cell are adjusted.

Section V.

Figure 13:
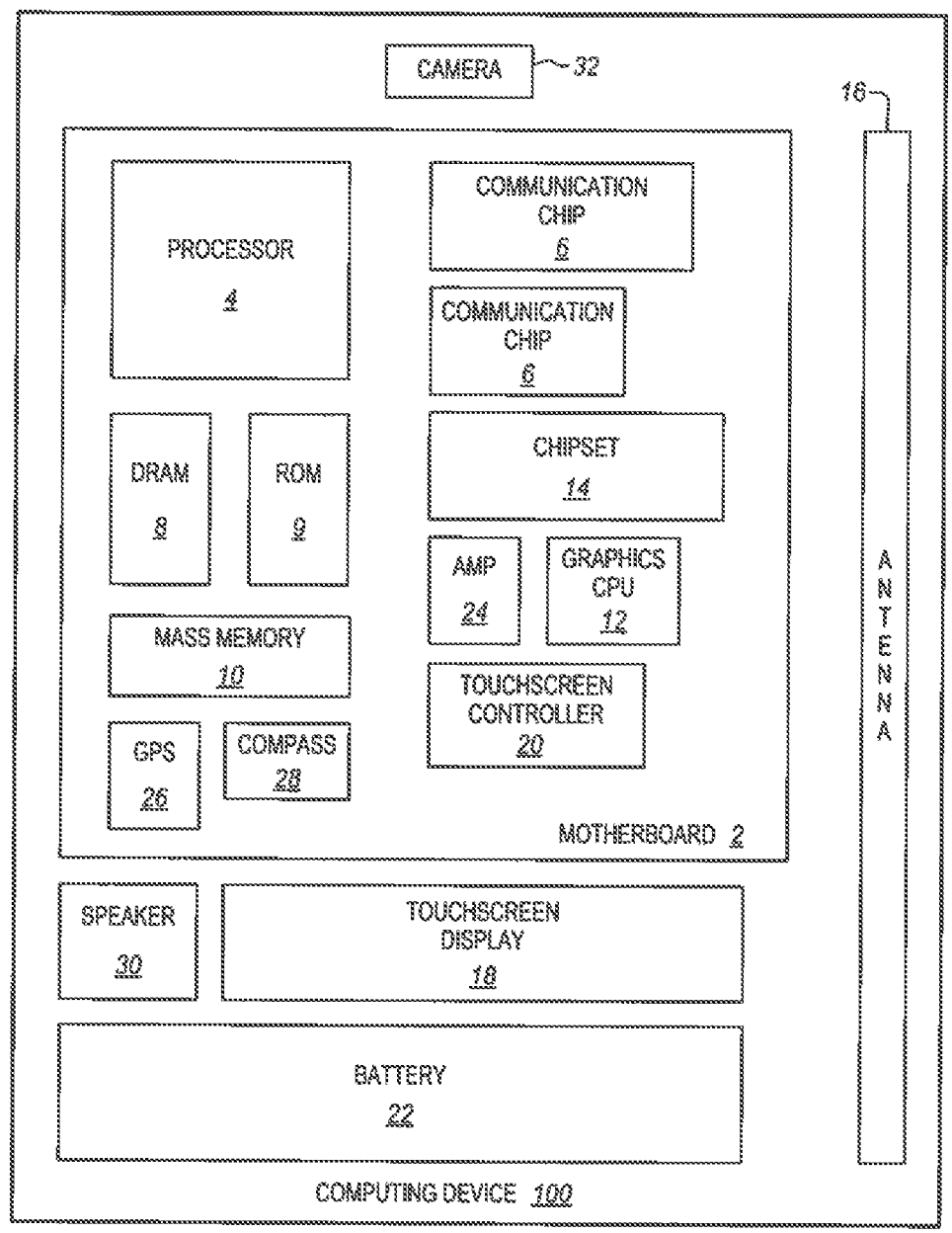
FIG. 13 is a block diagram of a computer system suitable for use as a mobile device, a protocol tester, or a control system according to an embodiment of the present invention.

This section describes a computing device that may be used to advantage in the systems and techniques described above. FIG. 13 illustrates a computing device 100 in accordance with one implementation of the invention. Such a computing device may be used to collect field traces, to replay field traces, to test protocols, and as a device to be tested as described above. The computing device 100 houses a system board 2. The board 2 may include a number of components, including but not limited to a processor 4 and at least one communication package 6. The communication package is coupled to one or more antennas 16. The processor 4 is physically and electrically coupled to the board 2. At least one antenna 16 integrated with a communication package 6 and is physically and electrically coupled to the board 2 through the package.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, and a mass storage device (such as hard disk drive) 10, compact disk (CD) (not shown), digital versatile disk (DVD) (not shown), and so forth. These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The processor 4 of the computing device 100 includes an integrated circuit die packaged within the processor 4. The processor may be combined on the same die or package with any other components. The term "processor" may refer to any device or portion of a device that processes electronic data from registers and/or memory to transform that electronic data into other electronic data that may be stored in registers and/or memory.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an apparatus for testing a radio communications device that includes a field trace source to replay recorded field traces, a protocol tester to receive the replayed field traces and configuration parameters, and to send/receive signals to/from a device under test, and a channel emulator coupled to the field trace source, and between the protocol tester and the device under test, to receive the replayed field traces, to mix the replayed field traces with signals and to emulate the channel between the protocol tester and the device under test.

In further embodiments, the protocol tester further comprises a loader and a co-processor, the loader to receive the replayed field traces, and the co-processor to extract the signals to be sent to the device under test by the protocol tester.

In further embodiments, the field traces comprise channel impulse response signals.

In further embodiments, the field traces comprise radio signals recorded in a natural radio environment.

Further embodiments include a base station configuration module to extract base station configuration parameters from the field traces and to send the base station configuration parameters to the protocol tester, the protocol tester to receive the base station configuration parameters from the base station configuration module and to send and receive signals to and from the device under test based on the received base station configuration parameters.

Some embodiments pertain to a method for testing a radio communications device that includes extracting configuration parameters from collected field traces, configuring a protocol tester with the extracted configuration parameters, replaying the collected field traces, extracting a radio environment from the collected field traces, extracting signals to be replayed from the collected field traces, combining signals to be replayed with the extracted radio environment in a channel emulator, sending the combined signals to a device under test through a wired connection, receiving responses to the signals being replayed from the device under test through the wired connection, and recording the received responses.

In further embodiments extracting signals to be replayed comprises loading the field traces into a loader, processing the loaded field traces by a co-processor of the protocol tester to extract the signals.

Further embodiments include synchronizing the extracted radio environment with the replayed signals.

Further embodiments include modifying the signals to be replayed to mimic a desired radio environment.

Some embodiments pertain to a method for generating a sequence of channel impulse responses to represent a wireless radio communications channel to test a wireless radio communications device, the method includes generating a first set of channel impulse responses with a ray-tracer, the first set corresponding to a first sampling rate, generating a plurality of additional parameters to describe the first set of channel impulse responses, interpolating the first set using the additional parameters to form a second set of channel impulse responses, the second set corresponding to a second sampling rate higher than the first sampling rate, and applying the synthesized sequence to represent a channel between a base station or a base station emulator and the device to be tested.

Further embodiments include interpolating is performed in an interpolator of a radio channel emulator, the method further comprising sending the first set of channel impulse responses and the parameters, and wherein interpolating comprises interpolating by the channel emulator using the added parameters.

In further embodiments generating parameters comprises generating parameters to describe two angles representing a direction of arrival to each tap in the first set of channel impulse responses.

In further embodiments, generating parameters comprises generating parameters to describe a position and a velocity of the receiver for every channel impulse response in the first sequence of channel impulse responses.

In further embodiments, generating parameters comprises generating parameters to describe a velocity of the receiver for every channel impulse response in the first sequence of channel impulse responses.

In further embodiments, generating parameters comprises generating parameters sufficient to determine whether a traced ray in the first set is present in two adjacent samples of the first set.

In further embodiments, generating a first set of channel impulse responses comprises using a database, the database comprising a geometrical description of an environment in which the ray-tracer is operating.

Some embodiments pertain to an apparatus that includes a ray tracer to generate a first set of channel impulse responses representing a wireless radio communications channel, the first set corresponding to a first sampling rate, a processor to post-process the first set of channel impulse responses with additional information for use by a channel emulator to interpolate the first set of channel impulse responses, and a wireless radio communications channel emulator to interpolate the first set using the additional information to form a second set of channel impulse responses to represent a wireless radio channel between the channel emulator and a device to be tested, the second set corresponding to a second sampling rate higher than the first sampling rate, and to apply the synthesized sequence to the signals exchanged with and by the device to be tested.

In further embodiments, the additional information includes, per single tap in the first sequence of channel impulse responses, one or more of two angles representing a direction of arrival, position and velocity of the receiver.

Some embodiments pertain to a method of creating realistic test signals for a radio communications device that includes collecting field traces using a mobile terminal by establishing a signaling link with a serving wireless node, extracting channel information for the signaling link from the mobile terminal using the field traces, extracting channel allocations for the signaling link from the mobile terminal using the field traces, reconstructing the signaling link channel using the channel information extracted from the field traces, and applying the extracted channel allocations, the reconstructed signaling link channel, and the reconstructed interfering channels to a second mobile terminal to test the mobile terminal.

In further embodiments, applying the signaling link channel comprises applying the signaling link channel to a fader, wherein the fader is connected between a signaling box and the second mobile terminal In further embodiments, reconstructing signaling link channel includes extracting signaling link demodulated reference symbols and the corresponding received power for the demodulated reference symbols from the field traces, reconstructing channel impulse responses from the demodulated reference symbols, and generating signaling link noise using the channel impulse responses.

Further embodiments include extracting channel information for the interfering link using field traces, extracting channel allocations for the interfering links using field traces, and reconstructing the interfering channels using the replayed signal traces, wherein applying further comprises applying the reconstructed interfering channels to the second mobile terminal.

Further embodiments include emulating interfering wireless nodes using the interfering channel allocations.

In further embodiments, the first mobile terminal and the second mobile terminal are the same terminal.

Some embodiments pertain to an apparatus that include a mobile terminal to collect field traces by establishing a signaling link with a serving wireless node, an external elaboration unit to extract channel information for the signaling link from the mobile terminal using the field traces, to extract channel allocations for the signaling link from the mobile terminal using the field traces, to reconstruct the signaling link channel using the channel information extracted from the field traces, and a channel emulator to apply the extracted channel allocations, the reconstructed signaling link channel, and the reconstructed interfering channels to a second mobile terminal to test the second mobile terminal.

In further embodiments, the mobile terminal collects field traces for interfering channel signaling and allocations and wherein the external elaboration unit further extracts the interfering channel signaling and allocations.

Further embodiments include a signaling box to generate signaling representing interfering channel allocations and to provide the signaling to the same or another channel emulator.

Some embodiments pertain to a method for testing a radio communications device that include attaching a device under test to an emulated serving cell, establishing a communications channel between the device under test and the emulated serving cell, activating a load emulating cell, injecting interference into the established communications channel from the load emulating cell, and applying a fader to the established communications channel and adjusting transmit power between the emulated serving cell and the load emulating cell.

In further embodiments, the transmit power of the downlink channel from the emulated serving cell and the load emulating cell are set to standard values for NodeBs of WCDMA.

In further embodiments, the load emulating cell is synchronized per frame and per chip to the emulated serving cell.

In further embodiments, injecting interference comprises injecting orthogonal channel noise wherein the channel noise is orthogonal with respect to the communications channel in the emulated serving cell.

In further embodiments, the communications channel is a WCDMA channel and wherein the orthogonal channel interference has different channelization codes from the common and the dedicated channels.

In further embodiments, applying a fader comprises changing the transmit power of the emulated serving cell or of the load emulating cell.

In further embodiments, the communications channel is a WCDMA channel and changing the transmit power for the load emulating cell comprises changing common and dedicated WCDMA downlink physical channels with respect to the transmit power of the emulated serving cell.

In further embodiments, the communications channel is a WCDMA channel and changing the transmit power for the load emulating cell comprises changing the orthogonal channel interference power with respect to the transmit power of the emulated serving cell.

In further embodiments, applying a fader comprises applying an emulated multipath propagation channel to the communications channel between the device under test and the emulated serving cell and applying an emulated multipath propagation channel to the communications channel between the device under test and the load emulating cell.

In further embodiments, applying an emulated multipath propagation channel comprises synchronizing multipath and direct channels per frame and per chip the signals output from the fader.

Some embodiments pertain to an apparatus that includes an emulated serving cell to establish a communications channel with an attached device under test, a load emulating cell to inject interference into the established communications channel, and a fader in the established communications channel to adjust transmit power between the emulated serving cell and the load emulating cell.

What is claimed is:

1. An apparatus for testing a radio communications device comprising:
    a field trace source to replay recorded field traces;
    a protocol tester to receive the replayed field traces to extract configuration parameters from the replayed field traces, to extract signals from the field traces, to send the signals to a device under test, and to receive signals from the device under test; and
    a channel emulator coupled to the field trace source, and between the protocol tester and the device under test, to receive the replayed field traces, to mix the replayed field traces with signals and to emulate the channel between the protocol tester and the device under test.

2. The apparatus of claim 1, wherein the protocol tester further comprises a loader and a co-processor, the loader to receive the replayed field traces, and the co-processor to extract the signals to be sent to the device under test by the protocol tester.

3. The apparatus of claim 1, wherein the field traces comprise channel impulse response signals.

4. The apparatus of claim 1, wherein the field traces comprise radio signals recorded in a natural radio environment.

5. The apparatus of claim 1, wherein the field traces comprise channel impulse responses collected in the field using a mobile receiver.

6. The apparatus claim 1, further comprising a base station configuration module to extract base station configuration parameters from the field traces and to send the base station configuration parameters to the protocol tester, the protocol tester to receive the base station configuration parameters from the base station configuration module and to send and receive signals to and from the device under test based on the received base station configuration parameters.

7. The apparatus of claim 6, wherein the base station configuration module tracks and maintains a state of an emulated base station based on extracted base station configuration parameters for use in analyzing signals received from the device under test.

8. The apparatus of claim 1, wherein the channel emulator comprises a fader to attenuate the field traces and to mix the field traces with noise.

9. The apparatus of claim 8, wherein the noise comprises generated orthogonal channel noise, the channel noise being orthogonal with respect to the emulated channel.

10. A method for testing a radio communications device comprising:
    extracting configuration parameters from collected field traces;
    configuring a protocol tester with the extracted configuration parameters;
    replaying the collected field traces;
    extracting a radio environment from the collected field traces;
    extracting signals to be replayed from the collected field traces;
    combining signals to be replayed with the extracted radio environment in a channel emulator;
    sending the combined signals as an emulated channel from the channel emulator to a device under test through a wired connection;
    receiving responses to the signals being replayed from the device under test through the wired connection; and
    recording the received responses.

11. The method of claim 10, wherein extracting signals to be replayed comprises loading the field traces into a loader, processing the loaded field traces by a co-processor of the protocol tester to extract the signals.

12. The method of claim 10, further comprising synchronizing the extracted radio environment with the replayed signals.

13. The method of claim 10, further comprising modifying the signals to be replayed to mimic a desired radio environment.

14. The method of claim 10, wherein configuring the protocol tester comprises tracking and maintaining a state of an emulated base station based on the extracted configuration parameters for use in analyzing signals received from the device under test.

15. The method of claim 10, wherein extracting configuration parameters comprises:
    extracting channel information for a signaling link with the device under test using the field traces;
    extracting channel allocations for the signaling link using the field traces;
    reconstructing a signaling link channel using the channel information extracted from the field traces; and
    applying the extracted channel allocations, the reconstructed signaling link channel, and the reconstructed interfering channels to generate a configuration for the channel emulator.

16. The method of claim 10, further comprising:
    injecting interference into the combined signals; and
    applying a fader to the combined signals and adjusting transmit power between the extracted signals and the injected interference.

17. The method of claim 16, wherein the noise comprises generated orthogonal channel noise, the channel noise being orthogonal with respect to the emulated channel.

18. An apparatus comprising:
a device to be tested;
a base station or base station emulator having a channel between the base station and the device to be tested;
a field trace source to replay recorded field traces;
a protocol tester coupled to the base station to receive the replayed field traces to extract configuration parameters from the replayed field traces, to extract signals from the field traces, to send the signals to a device under test, and to receive signals from the device under test; and
a channel emulator of the base station coupled to the field trace source, and between the protocol tester and the device under test, to receive the replayed field traces, to mix the replayed field traces with signals and to emulate the channel between the protocol tester and the device under test.

19. The apparatus of claim 18, further comprising a loader and a co-processor, the loader to receive the replayed field traces, and the co-processor to extract the signals to be sent to the device under test by the protocol tester.

20. The apparatus of claim 18, a base station configuration module to extract base station configuration parameters from the field traces and to send the base station configuration parameters to the protocol tester, the protocol tester to receive the base station configuration parameters from the base station configuration module and to send and receive signals to and from the device under test based on the received base station configuration parameters.

* * * * *